2,974,922

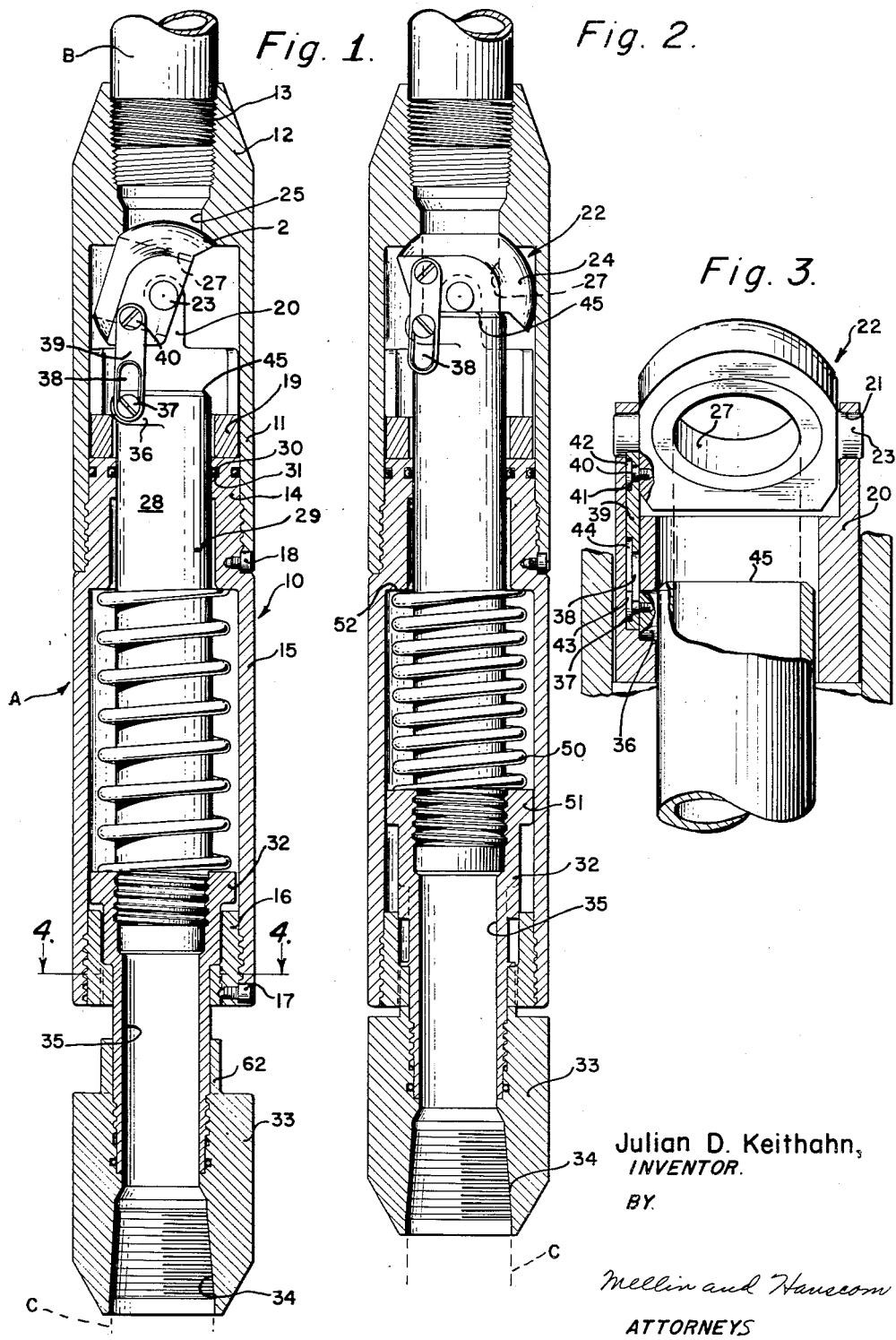
March 14, 1961   J. D. KEITHAHN   2,974,922
TUBING CONTROL VALVE APPARATUS
Filed Sept. 30, 1957   3 Sheets-Sheet 1
Julian D. Keithahn,
INVENTOR.
BY
ATTORNEYS March 14, 1961  J. D. KEITHAHN  2,974,922
TUBING CONTROL VALVE APPARATUS
Filed Sept. 30, 1957  3 Sheets-Sheet 2
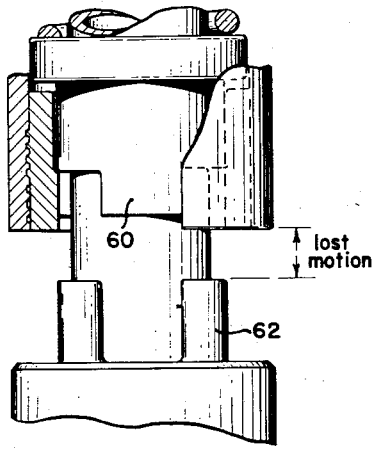
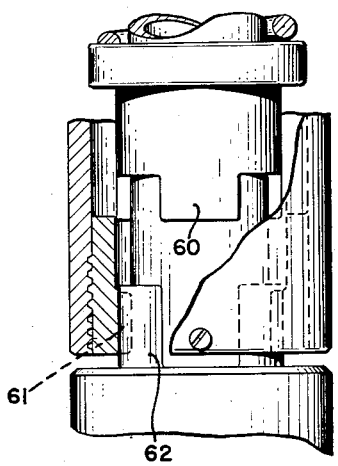
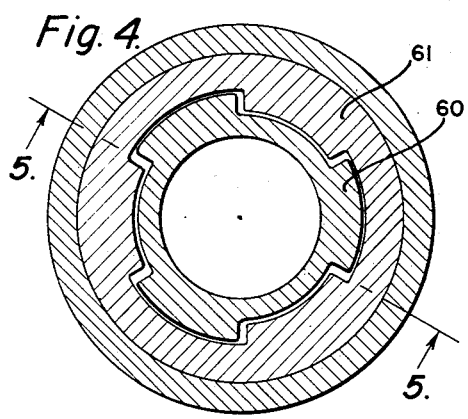
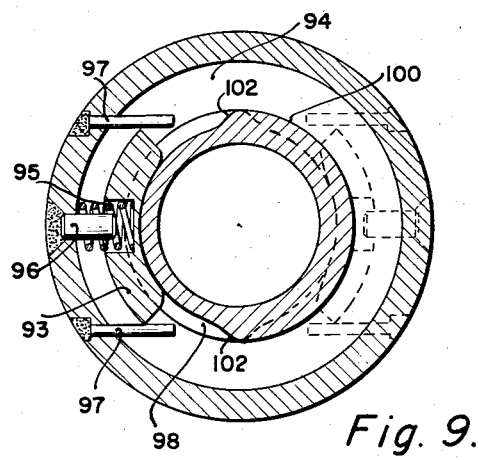
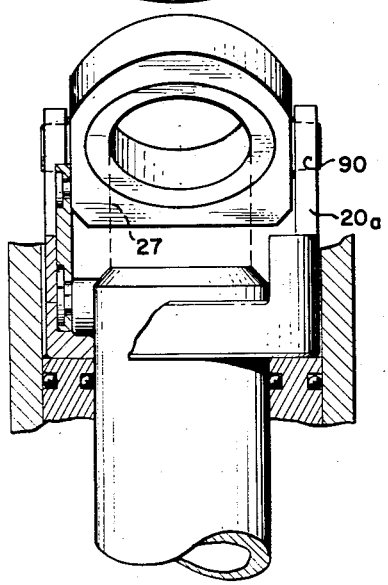
Julian D. Keithahn,
INVENTOR.
BY
ATTORNEYS March 14, 1961  J. D. KEITHAHN  2,974,922
TUBING CONTROL VALVE APPARATUS
Filed Sept. 30, 1957  3 Sheets-Sheet 3
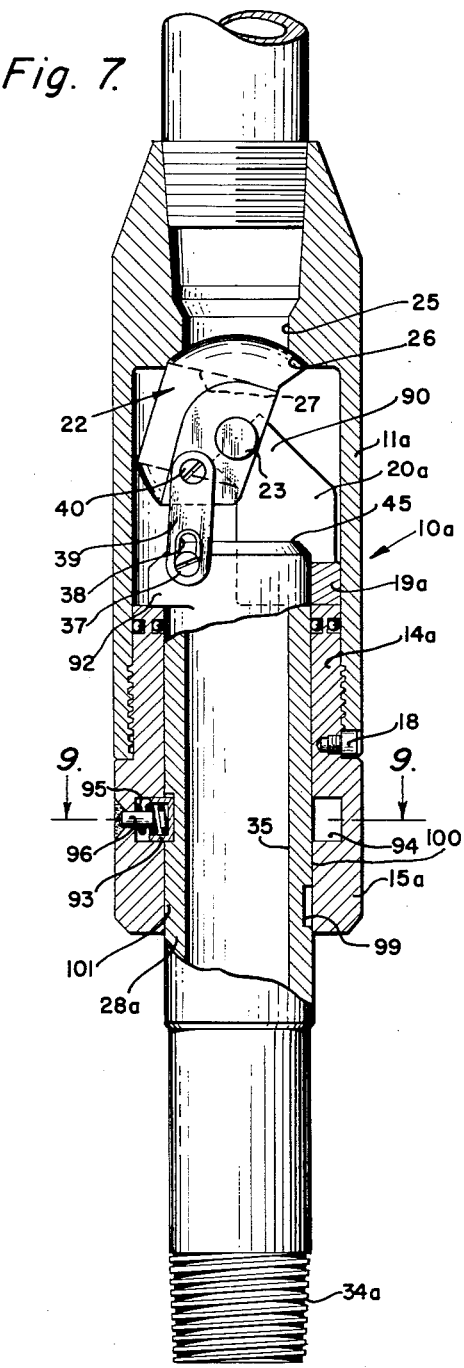
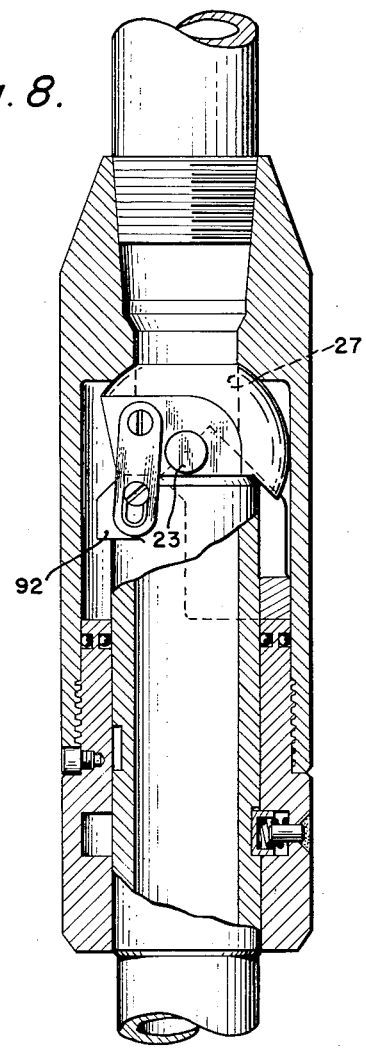
Julian D. Keithahn,
INVENTOR.
BY
Meelin and Hanscom
ATTORNEYS United States Patent Office 2,974,922
Patented Mar. 14, 1961

TUBING CONTROL VALVE APPARATUS

Julian D. Keithahn, Anaheim, Calif., assignor to Baker Oil Tools, Inc., Los Angeles, Calif., a corporation of California Filed Sept. 30, 1957, Ser. No. 687,136

18 Claims. (Cl. 251—77)

The present invention relates to valve apparatus, and more particularly to valve apparatus adapted to control flow of fluid in a tubular string disposed in a well bore, such as drill pipe and tubing.

An object of the present invention is to provide a valve apparatus to be incorporated in a tubular string, which is shiftable between opened and closed conditions by relative longitudinal movement between telescopic members, the valve apparatus having a straight through and unobstructed passage when in open position, being relatively compact, and operating in an easy and smooth manner.

Another object of the invention is to provide a valve apparatus to be incorporated in a tubular string which is shifted between opened and closed conditions by relative longitudinal movement between telescopic members in which the valve apparatus cannot be inadvertently opened or closed.

A further object of the invention is to provide a valve apparatus to be incorporated in the tubular string, which is positively shifted between opened and closed positions, positively located in such position, and in which the fluid pressure tends to hold the valve in its closed position.

An additional object of the invention is to provide a valve apparatus to be incorporated in a tubular string and embodying coengageable generally spherically shaped valve members, one of which is rotatable with respect to the other and shiftable between opened and closed positions by relative longitudinal movement between telescopic members, the valve members having unobstructed, straight-through passages therethrough when in open condition, so as to minimize erosion of the parts by fluid flowing through the valve apparatus and to permit other objects to be moved through the valve apparatus.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through a valve apparatus, with the valve in closed condition;

Fig. 2 is a view similar to Fig. 1, the valve being in open condition;

Fig. 3 is an enlarged view of a portion of the apparatus disclosed in Figs. 1 and 2, parts being shown in side elevation and parts in longitudinal section;

Fig. 4 is an enlarged cross-section taken along the line 4—4 on Fig. 1;

Fig. 5 is a combined side elevational and longitudinal sectional view on an enlarged scale of the clutch portion of the apparatus shown in Fig. 1;

Fig. 6 is a view similar to Fig. 5 with the clutch in another operative position;

Fig. 7 is a longitudinal section through another embodiment of the invention, the valve being in closed position;

Fig. 8 is a view similar to Fig. 7, with the valve in open position;

Fig. 9 is an enlarged cross-section taken along the line 9—9 on Fig. 7;

Fig. 10 is an enlarged side elevational and sectional view through a portion of the valve apparatus shown in Figs. 7 and 8.

As disclosed in the drawings, a valve apparatus A is secured to a tubular string B, such as a string of tubing or drill pipe extending to the top of a well bore. The lower portion of the valve apparatus is secured to a lower tool C, which may be a well packer adapted to be anchored in packed-off condition against the wall of a well casing.

As illustrated in Figs. 1 to 6, inclusive, the valve apparatus A includes an outer housing or body 10 that consists of an upper housing section 11 having an upper threaded box 12 for threadedly securing the housing to the adjacent threaded pin end 13 of a tubular section B thereabove. This upper housing section 11 encompasses and is threadedly secured to the upper portion 14 of a lower housing section 15 that has a lower head 16 threadedly secured thereto, which is prevented from becoming disconnected therefrom by the cap screw 17. Similarly, threaded disconnection between the upper and lower housing sections 11, 15 is prevented by a cap screw 18 extending between these parts.

Resting upon the upper end of the lower housing section 15 is a supporting sleeve or ring 19 having upwardly extending, diametrically opposed arms 20 integral therewith that have diametrically opposed holes 21 therein adapted to pivotally carry a generally spherically-shaped valve head member 22. This valve head member has oppositely directed trunnions or bearing pins 23 welded, or otherwise suitably secured, to its sides and disposed within the companion bearing holes 21 in the upper portion of the supporting arms. The generally spherical valve head 22 has a spherical external surface 24 thereon adapted to extend across a central passage 25 in the upper portion of the outer housing or body in engagement with a companion spherically-shaped valve seat 26 on the outer housing member surrounding the passage 25.

With the supporting sleeve or ring 19 resting upon the upper end of the lower housing section 15, the radial distance from the center of curvature of the head 22 to its spherical surface 24 is substantially the same as the radial distance from the center of the curvature of the valve head to the spherical valve seat 26, so that the spherical valve head surface 24 makes a snug sliding fit with its companion seat 26, in order to fully close the valve when the valve head has turned about its trunnion axis to the position illustrated in Fig. 1. The valve head can be rotated about its trunnion axis to the desired arcuate extent to align a passage 27 extending completely through the valve head with the passage 25 in the upper portion of the outer housing 11. The diameter of the passage 27 through the valve head 22 is preferably made substantially equal to the housing passage 25 and when aligned therewith (Fig. 2) forms a continuation thereof, there preferably being no interruptions in the cylindrical passage surfaces 25, 27, so that fluid will flow smoothly from one passage into the other passage.

The valve head 22 is turned in response to relative telescopic movement between the outer housing or member 10 and an inner tubular member or mandrel 28 disposed within the housing. This inner tubular member includes an upper tubular section 29 which is slidable along the upper portion 14 of the lower housing section 15, leakage between these parts being prevented by means of a suitable said seal ring 30 disposed in an inner groove 31 in the lower housing section and slidably and sealingly engaging the periphery of the upper tubular section 29. The lower end of the upper tubular section is disposed within and threadedly attached to the upper end of an intermediate tubular section 32, the lower end of which is, in turn, threadedly secured within a lower section or head 33. This lower head or section has a threaded box 34 adapted to be threadedly connected to the upper pin end of the lower tool C, such as a well packer adapted to be anchored in packed-off condition against the wall of a well casing, or the like.

The central passages 35 through the upper, intermediate and lower tubular sections 29, 32, 33 are preferably of the same internal diameter as the passages 27, 25 through the valve head 22 and the upper portion of the housing, to afford a uniform channel through which fluid can pass through the valve apparatus when it is in open condition.

The upper portion 29 of the inner tubular member 28 extends through the supporting sleeve or ring 19. This portion has opposed integral ears 36 thereon in which pins or screws 37 are threaded, which extend through elongate slots 38 in links 39 mounted on opposite sides of the tubular member 28 and the head 22. The upper ends of the links 39 are pivotally attached to the sides of the valve head by pins or screws 40. As specifically disclosed, each upper pin or screw 40 has its inner portion threaded in the valve head 22, its intermediate cylindrical portion 41 disposed within a companion hole in the upper end of the link 39 and its head 42 received within a counterbore in the upper end of the link. The lower pin or screw 37 has its inner portion threaded in the ear 36 of the tubular member, its intermediate portion having a diameter conforming to the width of the slot 38 and its outer head portion 43 received within a recess 44 extending around the slot, so that the head 43 of the pin is subtsantially flush with the outer surface of the link 39.

The pin and slot arrangement affords a lost motion connection between each link 39 and the inner tubular member 28 so that the outer housing 10, valve head 22, links 39, and supporting sleeve or ring 19 can move downwardly with respect to the inner tubular member 28 to a certain distance before the pins 37 can engage the links 39 at the upper ends of the slots 38. When such engagement occurs, as a result of downward telescopic movement of the housing 10 with respect to the inner tubular member 28, the links will turn the valve head 22 about its trunnion axis in a clockwise direction, as seen in Figs. 1 and 2, in order to shift the valve head 22 to an open position in which its passage 27 is aligned with the housing and mandrel passages 25, 35. The extent of shifting is limited by engagement of the upper end 45 of the mandrel 28 with the lower side of the head 22, the parts now occupying the position illustrated in Fig. 2, which is a valve opening position.

Conversely, when the housing 10, supporting sleeve 19, valve member 22 and links 39 are shifted upwardly relative to the inner mandrel 28, the valve head 22 will not be rotated about its axis until the links move upwardly sufficiently along the pins 37 disposed in the slots 38, in which the lower ends of the links engage such pins whereupon the mandrel 28 will exert a pull on the links 39 in a downward direction to rotate the valve head 22 about its tunnion axis in a counter-clockwise direction and shift the valve head 22 to a position in which its spherical surface 24 extends across the housing passage 25 and sealingly engages the companion spherical seat 26 in the housing, which is a valve closing position. (Fig. 1.)

The valve is normally urged toward its closed position and tends to remain in this closed condition because of the presence of a helical compression spring 50 which is disposed around the mandrel 28 with its lower end engaging a flange or spring seat 51 provided by the upper end of the intermediate section 32, and its upper end engaging a downwardly facing shoulder 52 provided by the upper portion 14 of the lower housing section 15. This spring tends to urge the housing 10 upwardly with respect to the mandrel 28, to maintain the valve head 22 in its closed position against the valve seat 26. When the valve is to be shifted to its open condition, the housing 10 is lowered relative to the mandrel 28 against the force of the spring 50 to create the arcuate movement of the head within the housing and its shifting to the open position disclosed in Fig. 2. Such downward movement can take place since the inner mandrel 28 can be held stationary by the lower tool C which has elements thereon (not shown) which engage the wall of the well casing to hold the mandrel stationary, or at least resist its longitudinal movement in the well casing with sufficient force as to permit downward movement of the housing 10 to occur and overcome the force of the compression spring 50.

During downward movement of the apparatus in the well casing or well bore, it may be desired to retain the valve in the closed position illustrated in Fig. 1 in which fluid is prevented from flowing upwardly through the lower tool C and the valve apparatus A into the tubular string B thereabove. If the lower tool or mandrel 28 encounters resistance to its downward movement, the force of the spring 50 might be overcome as the tool is lowered in the well bore, resulting in downward telescoping of the housing 10 relative to the mandrel 28 and shifting of the valve to the open position. In the present instance, such inadvertent shifting of the valve to an open condition is prevented. As illustrated, the intermediate section 32 of the mandrel has circumferentially spaced clutch teeth 60 on its exterior adapted to mesh with the companion clutch teeth 61 extending inwardly of the lower housing head 16. Spaced longitudinally from the tubular member clutch teeth 60, but disaligned therewith, is another set of lower clutch teeth 62 formed on the mandrel 28 and provided on the upper portion of the mandrel section or head 33. The distance between the upper and lower sets of clutch teeth 60, 62 on the mandrel is slightly greater than the length of the housing clutch teeth 61.

When the housing 10 is moved downwardly relative to the inner mandrel 28 with the valve in the closed condition shown in Fig. 1, the lower ends of the housing teeth 61 will abut the upper ends of the clutch teeth 62 extending upwardly from the lower mandrel section 33. The distance that the housing 10 must move downwardly before such engagement occurs is no greater than the amount of lost motion afforded by the pin and slot connection 37, 38 between the mandrel 28 and the links 39. With such distance of downward travel of the housing 10 relative to the mandrel 28, the valve will not be rotated from the closed condition shown in Fig. 1. Accordingly, during downward movement of the apparatus in the well bore, the housing 10 can only move downwardly of the mandrel 28 to a relatively slight extent before the ends of the clutch teeth 51, 62 engage, and such extent is insufficient to effect shifting of the valve head 22 to an open position.

When the valve is to be opened, the tubular string B and housing 10 are lowered relative to the mandrel 28 to bring the lower ends of the housing clutch teeth 61 into engagement with the upper end of the mandrel clutch teeth 62. The housing must then be turned a sufficient number of degrees as to bring its clutch teeth 61 in alignment with the spaces between the lower set of teeth 62 of the mandrel 28. When such alignment occurs, further downward movement of the housing 10 with respect to the inner mandrel 28 can take place, causing the pins 37 to engage the links 39 at the upper portions of the slots 38 and then rotate the head 22 in a clockwise position to the extent limited by engagement of the upper end 45 on the mandrel with the valve head 22, in which the valve is in open condition (Fig. 2). When in this condition, the valve head 22 is clamped between the spherical seat 26 and the upper end 45 of the mandrel, to assure its proper location with its passage 27 in alignment with the housing and mandrel passages 25, 35, forming an uninterrupted and continuous passage through the valve apparatus.

When the valve is to be shifted to a closed position, the housing 10 is moved upwardly along the mandrel 28, which action will be aided by the spring 50 until the housing clutch teeth 61 engage the lower ends of the upper set of clutch teeth 60 on the mandrel. During such motion the valve head 22 remains in its open position with respect to its companion seat 26, since only the lost motion of the pins 37 in the slotted links 39 is taken up, the pins 37 then being disposed at the lower ends of the slots 38. The housing 10 is then turned arcuately to the required extent to bring the housing clutch teeth 61 in alignment with the spaces between the upper set of clutch teeth 60, whereupon upward movement of the housing 10 can occur to a further extent, to cause the links 39 to pull downwardly on the head 22 and turn it in a counter-clockwise position, as disclosed in Figs. 1 and 2, to relocate the spherical surface 24 of the head across the housing passage 25 and in full engagement with the seat 26, such as disclosed in Fig. 1. The valve is now in a closed condition and will remain in this condition until it is to be purposely reopened.

The same general valve device is shown in the other form of invention illustrated in Figs. 7 to 10 inclusive. The outer housing 10a includes the upper section 11a having the spherical seat 26, which is threadedly secured to the lower section 15a. The inner mandrel 28a, telescoped within the housing has a lower pin end 34a which may be secured to the body portion of the lower tool C, such as a well packer adapted to be anchored in packed-off condition against the wall of a well casing. The spherical valve head 22 has a passage 27 therethrough preferably of the same diameter as the passages 25 through the upper portion of the housing 10a and the tubular mandrel 28a, this valve head having trunnions 23 integral with it and extending in opposite directions from its sides, being received within saddles bearing supports 90 provided by the upwardly extending arms 20a of an arcuate support segment or ring 19a surrounding the mandrel 28a and resting upon the upper end of the lower housing section 15a. The links 39 are pin connected to the head 22 by means of the screws 40 and to the mandrel 28a by the pin and slot interconnection 37, 38, in substantially the same manner as in the other form of invention.

The action of shifting the valve between open and closed positions is essentially the same as in the other form of the invention, in that relative downward movement of the housing 10a with respect to the mandrel 28a will effect rotation of the valve head 22 from the closed position shown in Fig. 7 to the open position shown in Fig. 8, in which the valve head passage 27 is aligned with the passages 25, 35 in the housing and mandrel, the upper end 45 of the mandrel engaging the valve head 22 and clamping it against the valve seat 26. Conversely, relative upward movement of the housing 10a with respect to the mandrel 28a will cause the links 39 to exert a pull on the head 22, turning it in a counterclockwise direction and shifting it to the closed position shown in Fig. 7. Such extent of upward movement of the housing 10a relative to the mandrel 28a is limited by engagement of an outwardly projecting shoulder 92 on the mandrel with the upper end of the lower housing section 15a.

The valve may be releasably retained in both its open and closed conditions. As illustrated, this purpose is achieved by releasably coupling or clutching the housing 10a to the mandrel 28a in its fully telescoped or fully extended positions. The clutching device illustrated includes a radially shiftable clutch shoe or dog 93 mounted in an internal groove 94 in the lower housing section 15a and urged inwardly by a helical compression spring 95 surrounding a radial centering pin 96 welded or otherwise suitably secured to the housing 15a. The inner portion of the spring 95 engages the shoe 93 and its outer portion engages the base of the housing groove 94. The clutch shoe or dog 93 is guided in its radial movement and is confined within the groove 94 by the upper and lower sides of the groove. It is prevented from moving arcuately in the groove with respect to the housing 10a by the guide pins 97 extending inwardly of the groove 94 and suitably welded or otherwise secured to the housing 10a.

The shoe 93 is adapted to be disposed selectively within an upper external groove 98 in the mandrel 28a or in a lower external and arcuately displaced groove 99 in the mandrel. A bridge piece or cam portion 100 extends arcuately between the ends of the upper groove 98, such bridge piece or cam portion 100 actually forming a continuation of the periphery of the inner mandrel 28a. Similarly, the lower groove 99 terminates in an intervening bridge piece or cam portion 101 between its ends which actually forms the peripheral or ungrooved portion of the mandrel 28a. This latter cam portion 101 is circumferentially offset with respect to the cam portion 100 of the other clutch groove 98, the cam portions preferably being displaced from one another by 180 degrees. The arcuate ends of the base portion of each groove extends in an outward direction toward the periphery of its associated bridge piece to provide tapered or inclined cam surfaces 102 adapted to shift the clutch shoe or dog 93 out of the particular groove in which it is mounted.

The upper and lower groove 98, 99 are spaced apart longitudinally with respect to one another by a distance which is substantially equal to the travel of the housing 10a along the mandrel 28a in shifting the valve head 22 between opened and closed positions relative to its companion seat 26. Thus, when the housing 10a is in its extended or elevated position relative to the inner mandrel 28a, the clutch shoe or dog 93 is in transverse alignment with the upper groove 98 and its cam position 100, and when the upper groove is aligned with the dog, the spuring 95 can shift it into the groove 98, in order to clutch or couple the housing 10a to the mandrel 28a in the position shown in Fig. 7, in which the valve is closed. On the other hand, when the housing 10a is in its downward or telescoped position with respect to the mandrel 28a, with the valve in the open condition, then the dog 93 is in transverse alignment with the lower groove 99 and its cam portion or bridge piece 101. Assuming that the dog is opposite the lower grooved 99, the spring 95 will shift it thereinto, to clutch or lock the housing 10a to the mandrel 28a in the position shown in Fig. 8, in which the valve is retained in its open position.

Assuming the valve to be in the closed position disclosed in Fig. 7, and with the clutch dog 93 in the upper clutch groove 98, the valve cannot be shifted to an open position and upward or downward movement of the housing 10a in the well bore will carry the mandrel 28a with it, relative movement between these parts being prevented. If the valve is to be shifted to an open position, the housing 10a is first rotated relative to the mandrel 28a, carrying the clutch dog 93 around with it until the clutch dog rides up either of the cam surfaces 102 and onto the bridge piece or cam piece 100 which is the periphery of the mandrel, the dog then being located completely out of the upper groove 98. When this occurs, the housing 10a may be lowered relative to the mandrel 28a, the clutch shoe or dog 93 sliding along the periphery of the mandrel until it reaches the lower groove 99, snapping thereunto and clutching or locking the valve in the open condition shown in Fig. 8. It is only necessary to move the housing 10a downwardly along the mandrel 28a and the clutch dog 93 will snap into the lower groove 99, since the upper and lower grooves 98, 99 are circumferentially offset from one another, as for example, 180 degrees, the lower bridge piece 101 being disaligned from the upper bridge piece 100. In other words, the lower groove 99 is aligned with the upper bridge piece 100 and the upper groove 98 is aligned with the lower bridge piece 101.

The apparatus can now be moved longitudinally in the well bore and will be locked in the open position shown in Fig. 8 with the clutch shoe 93 disposed in the lower groove 99. When the valve is again to be placed in its closed condition, the housing 10a is turned once again to shift the clutch dog 93 onto the lower cam or bridge piece 101, which will force the dog out of the groove 99, whereupon the housing 10a can be elevated along the mandrel 28a, the clutch dog 93 sliding along the periphery of the latter until it snaps back into the upper groove 98. When the parts are in this position, the valve head 22 has again rotated to a closed condition against its companion spherical seat 26 and across the housing passage 25.

In both forms of valve apparatus, a straight through passage is provided which can be made of a relatively large size. In fact, it can be made of at least the same diameter as the inside diameter of the tubular string B above the apparatus, so that assurance is had that other equipment can be moved completely through the apparatus, whenever desired. In addition, fluent materials, such as cement slurry, and the like, can also be moved completely through the apparatus A, whenever desired. The valve head 22 will effectively engage its companion seat 26 and is capable of withstanding a very high pressure differential, in view of the relatively large seating area. In addition, pressures from below the valve head 22 will urge it more firmly against its seat 26 and prevent leakage. Of course, the apparatus can be inverted from the positions shown. For example, the inner mandrel 28 or 28a can be secured to the tubing B thereabove and the housing 10 or 10a attached to the lower tool C, in which event, the tubing section B secured to the mandrel can be tested against leakage, whenever desired. The pressure imparted to the fluid in the tubular string acts in a downward direction on the valve head 22 tending to maintain it in sealing engagement with its companion seat 26.

The inventor claims:

1. In valve apparatus: an outer member; an inner member telescoped within said outer member; one of said members having a passage surrounded by a valve seat; a valve head engageable with said seat; means pivotally mounting said valve head on said one of said members, said mounting means allowing limited longitudinal movement of said valve head relative to said one member; and means interconnecting the other of said members and valve head to effect rotation of said head about its pivot axis with respect to said seat in response to relative telescopic movement between said members to slide said head along said seat and open and close said passage; said inner member being relatively shiftable in said outer member to an extent wherein said inner member engages said valve head and clamps said head against said seat.

2. In valve apparatus: an outer member; an inner member telescoped within said outer member; said outer member having a passage surrounded by a spherical valve seat; a valve head engageable with said seat; means pivotally mounting said valve head on said outer member, said mounting means allowing limited longitudinal movement of said valve head relative to said outer member; said head having a passage therethrough; and means interconnecting said inner member and said head to effect rotation of said head about its pivot axis with respect to said seat in response to relative telescopic movement between said members to slide said head along said seat and align said member and head passages or dispose said heat in closed relation across said member passage; said inner member being relatively shiftable in said outer member to an extent wherein said inner member engages said valve head and clamps said heat against said seat.

3. In valve apparatus: an outer member; an inner member telescoped within said outer member and rotatable relative thereto; one of said members having a passage surrounded by a spherical valve seat; supporting means rotatable relative to said one member; means limiting longitudinal movement of said supporting means relative to said one member; a valve head pivotally carried by said supporting means and having a spherically shaped portion engageable with said seat; means interconnecting the other of said members and valve head to effect rotation of said head about its pivot axis with respect to said seat in response to relative telescopic movement between said member to open and close said passage; and clutch means on said members to prevent relative rotation therebetween.

4. In valve apparatus: an outer member; an inner member telescoped within said outer member and rotatable relative thereto; said outer member having a passage surrounded by a valve seat; supporting means rotatable relative to said outer member; means limiting relative movement of said supporting means relative to said outer member; a valve head pivotally carried by said supporting means and engageable with said seat; link means interconnecting said inner member and head to effect rotation of said head about its pivot axis with respect to said seat in response to relative telescopic movement between said members to open and close said passage; upper and lower sets of clutch teeth on said inner member, said sets being disaligned from one another; and clutch teeth on said outer member adapted to mesh selectively with said upper and lower sets of clutch teeth.

5. In valve apparatus: an outer member; an inner member telescoped within said outer member; said outer member having a passage surrounded by a valve seat; supporting means rotatable relative to said outer member; means limiting relative movement of said supporting means relative to said outer member; a valve head pivotally carried by said supporting means and engageable with said seat; link means interconnecting said inner member and head to effect rotation of said head about its pivot axis with respect to said seat in response to relative telescopic movement between said members to open and close said passage; said inner member having upper and lower grooves therein; a clutch member on said outer member adapted to be disposed selectively in said grooves to selectively retain said valve head in opened or closed position with respect to said seat; and means for releasing said clutch member from said grooves.

6. In valve apparatus: an outer member; an inner member telescoped within said outer member and rotatable relative thereto; one of said members having a passage surrounded by a valve seat; supporting means rotatable relative to said one member; means limiting longitudinal movement of said supporting means relative to said one member; a valve head pivotally carried by said supporting means and engageable with said valve seat; and means interconnecting the other of said members and valve head to effect rotation of said head about its pivot axis with respect to said seat in response to relative telescopic movement between said members to slide said head along said seat and open and close said passage.

7. In valve apparatus: an outer tubular member having a central passage; an inner tubular member telescoped within said outer member and extending therefrom and having a central passage communicable with said other passage; one of said members having a valve seat surrounding its passage; supporting means rotatable relative to said one member; means limiting longitudinal movement of said supporting means relative to said one member; a head pivotally carried by said supporting means and engageable with said seat; said head having a passage therein; and means interconnecting the other of said members and valve head to effect rotation of said head about its pivot axis with respect to said seat in response to relative telescopic movement between said members to slide said head along said seat and align said head passage with said central passages of said members to permit flow of fluid between said central passages or dispose said head in closed relation across the central passage surrounded by said valve seat.

8. In valve apparatus: an outer member; an inner member telescoped within said outer member and rotatable relative thereto; one of said members having a passage surrounded by a spherical valve seat; supporting means rotatable relative to said one member; means limiting longitudinal movement of said supporting means relative to said one member; a valve head pivotally carried by said supporting means and having a spherically shaped portion engageable with said seat; and means interconnecting the other of said members and valve head to effect rotation of said head about its pivot axis with respect to said seat in response to relative telescopic movement between said members to slide said head along said seat and open and close said passage.

9. In valve apparatus: an outer tubular member having a central passage; an inner tubular member telescoped within said outer member and extending therefrom and having a central passage communicable with said other passage; said members being rotatable relative to each other; one of said members having a spherical valve seat surrounding its passage; supporting means rotatable relative to said one member; means limiting longitudinal movement of said supporting means relative to said one member; a valve head pivotally carried by said supporting means and having a spherically shaped portion engageable with said seat; said head having a passage therethrough; and means interconnecting the other of said members and valve head to effect rotation of said head about its pivot axis with respect to said seat in response to relative telescopic movement between said members to slide said head along said seat and align said head passage with said central passages of said members to permit flow of fluid between said central passages or dispose the spherically shaped portion of said head against seat and in closed relation across said passage surrounded by said valve seat.

10. In valve apparatus: an outer member; an inner member telescoped within said outer member and rotatable relative thereto; one of said members having a passage surrounded by a valve seat; supporting means rotatable relative to said one member; means limiting longitudinal movement of said supporting means relative to said outer member; a valve head pivotally carried by said supporting means and engageable with said seat; means interconnecting the other of said members and valve head to effect rotation of said head about its pivot axis with respect to said seat in response to relative telescopic movement between said members to slide said head along said seat and open and close said passage; and releasable means preventing telescopic movement between said members.

11. In valve apparatus: an outer member; and inner member telescoped within said outer member; said outer member having a passage surrounded by a valve seat; supporting means rotatable relative to said outer member; means limiting relative movement of said supporting means relative to said outer member; a valve head pivotally carried by said supporting means and engageable with said seat; and means interconnecting said inner member and head to effect rotation of said head about its pivot axis with respect to relative telescopic movement between said members to slide said head along said seat and open and close said passage.

12. In valve apparatus: an outer tubular member having a central passage; an inner member telescoped within said outer member and extending therefrom and having a central passage communicable with said other passage; said outer member having its passage surrounded by a valve seat; supporting means rotatable relative to said outer member; means limiting relative movement of said supporting means relative to said outer member; a valve head pivotally carried by said supporting means and engageable with said seat; said head having a passage therethrough; and means interconnecting said inner member and head to effect rotation of said head about its pivot axis with respect to said seat in response to relative telescopic movement between said members to slide said head along said seat and align said inner and outer member and head passages or dispose said head in closed relation across said outer member passage.

13. In valve apparatus: an outer member; an inner member telescoped within said outer member and rotatable relative thereto; said outer member having a passage surrounded by a spherical valve seat; supporting means rotatable relative to said outer member; means limiting relative movement of said supporting means relative to said outer member; a valve head pivotally carried by said supporting means and having a spherically shaped portion engageable with said seat; and means interconnecting said inner member and head to effect rotation of said head about its pivot axis with respect to its seat in response to relative telescopic movement between said members to slide said head along said seat and open and close said passage.

14. In valve apparatus: an outer member; an inner member telescoped within said outer member and rotatable relative thereto; said outer member having a passage surrounded by a spherical valve seat; supporting means rotatable relative to said outer member; means limiting relative movement of said supporting means relative to said outer member; a valve head pivotally carried by said supporting means and engageable with said seat; said head having a passage therethrough; and means interconnecting said inner member and said head to effect rotation of said head about its pivot axis with respect to said seat in response to relative telescopic movement between said members to slide said head along said seat and align said member and head passages or dispose said head in closed relation across said member passage.

15. In valve apparatus: an outer member; an inner member telescoped within said outer member and rotatable relative thereto; said outer member having a passage surrounded by a spherical valve seat; supporting means rotatable relative to said outer member; means limiting relative movement of said supporting means relative to said outer member; a valve head pivotally carried by said supporting means and engageable with said seat; said head having a passage therethrough; means interconnecting said inner member and said head to effect rotation of said head about its pivot axis with respect to said seat in response to relative telescopic movement between said members to slide said head along said seat and align said member and head passages or dispose said head in closed relation across said member passage; and releasable means preventing telescopic movement between said members.

16. In valve apparatus: an outer member; an inner member telescoped within said outer member and rotatable relative thereto; said outer member having a passage surrounded by a spherical valve seat; supporting means rotatable relative to said outer member; means limiting relative movement of said supporting means relative to said outer member; a valve head pivotally carried by said supporting means and engageable with said seat; said head having a passage therethrough; means interconnecting said inner member and said head to effect rotation of said head about its pivot axis with respect to said seat in response to relative telescopic movement between said members to slide said head along said seat and align said member and head passages or dispose said head in closed relation across said member passage; and clutch means acting between said members to releasably hold said members selectively in telescoped or extended positions to hold said valve head passage aligned with said outer member passage or said head closed against said seat and across said outer member passage.

17. In valve apparatus: an outer member; an inner member telescoped within said outer member; said outer member having a passage surrounded by a valve seat; supporting means rotatable relative to said outer member; means limiting relative movement of said supporting means relative to said outer member; a valve head pivotally carried by said supporting means and engageable with said seat; and link means interconnecting said inner member and head to effect rotation of said head about its pivot axis with respect to said seat in response to relative telescopic movement between said members to open and close said passage.

18. In valve apparatus: an outer member; an inner member telescoped within said outer member; said outer member having a passage surrounded by a valve seat; supporting means rotatable relative to said outer member; means limiting relative movement of said supporting means relative to said outer member; a valve head pivotally carried by said supporting means and engageable with said seat; link means interconnecting said inner member and head to effect rotation of said head about its pivot axis with respect to said seat in response to relative telescopic movement between said members to open and close said passage; said link means embodying a lost motion connection.

References Cited in the file of this patent

UNITED STATES PATENTS

| | | |
|---|---|---|
| 519,430 | Leidich | May 8, 1894 |
| 802,950 | Waterman | Oct. 24, 1905 |
| 807,243 | Chapin | Dec. 12, 1905 |
| 1,290,408 | Tew | Jan. 7, 1919 |
| 1,392,697 | Neesham | Oct. 4, 1921 |
| 1,681,966 | Zeidler | Aug. 28, 1928 |
| 1,784,381 | O'Stroske | Dec. 9, 1930 |
| 1,786,063 | Gumpper | Dec. 23, 1930 |
| 1,832,341 | Williamson | Nov. 17, 1931 |
| 1,939,128 | Meyer | Dec. 12, 1933 |
| 2,070,489 | McMichen | Feb. 9, 1937 |
| 2,433,405 | Stamm | Dec. 30, 1947 |
| 2,598,417 | Niemann | May 27, 1952 |
| 2,662,545 | Kelley | Dec. 15, 1953 |
| 2,894,715 | Bostock | July 14, 1959 |